May 1, 1962        G. L. NEELY        3,032,264

ENGINE START NUMBER ACCUMULATOR

Filed May 8, 1958

INVENTOR
GEORGE L. NEELY
BY
ATTORNEYS

United States Patent Office 3,032,264
Patented May 1, 1962

3,032,264
ENGINE START NUMBER ACCUMULATOR
George L. Neely, Berkeley, Calif., assignor to California Research Corporation, San Francisco, Calif., a corporation of Delaware
Filed May 8, 1958, Ser. No. 734,019
4 Claims. (Cl. 235—91)

This invention relates to means for integrating or accumulating and indicating the number of times an internal combustion engine, such as an automobile engine, is started and stopped, as evidenced by the heating and cooling cycles of an accessible part of the engine system and particularly refers to a mechanical registering mechanism actuated by a heat-responsive means associated with the said part, with the objective of indicating the periods at which the crankcase lubricant should be changed.

Historically, crankcase oil drain recommendations and practice have been based primarily on mileage, such as at 1000 or 2000 mile intervals. To remind the operator of these periods, devices associated with the odometer and thus responsive to the distance travelled by the motor vehicle have been used, such as those of U.S. Patents 2,656,817; 2,253,827; and 2,601,838. However, the actual conditions of automotive engine operation, such as the short distances and stop-and-go in city traffic as compared to long-distance trips, the effect of weather, and particularly very low ambient temperatures, have been found to be better guides to oil drain periods.

For example, the manufacturer of a popular make of automobile gives the following recommendations regarding crankcase oil drain procedure:

The initial oil change and subsequent changes should be made as required by driving conditions in accordance with the following recommendations:

*"500 mile change interval."*—This period should be used in cold weather when the car is used almost exclusively in the city for house-to-house or store-to-store operating conditions as experienced by doctors or city salesmen.

*"1,000 mile change interval."*—This interval should be used under average winter driving conditions when most of the driving is in the city with only occasional highway drivng.

*"2,000 mile change interval."*—This interval should be used under average summer driving conditions, when the car is operated under intermixed city and highway driving, such as town driving.

*"3,000 mile change interval."*—This interval should be used when the car is driven consistently on the highway with occasional city driving.

This invention comprehends broadly and has for its principal object an indicator and recorder or integrator for the number of times an engine is started and stopped, which has been found to be a more accurate criterion of the deterioration of the crankcase lubricant than the distance travelled by the automotive vehicle. A preferred arrangement for this purpose is a heat-responsive means associated with an exposed part of the engine or its associated exhaust or cooling system, that will respond to the cyclic temperature changes caused by the successive periods when the engine is operated and when it is shut down. A suitable mechanical integrator or register is provided to accumulate and to indicate the number of such cycles, and is desirably, but not necessarily, provided with a quick reset mechanism to restore the register to zero or to another predetermined condition. Also, it is contemplated that, under conditions of very low atmospheric temperature, approaching 0–30° F., when the crankcase lubricant and the engine itself are more susceptible to deterioration than at moderate temperatures, the heat-responsive means will advance the register at a controlled and more rapid rate per temperature change cycle than normal.

These and other objects and advantages will be more fully apparent from the following description and the attached drawing, which forms a part of this specification, and illustrates a preferred embodiment of the invention.

Figures 1, 2:
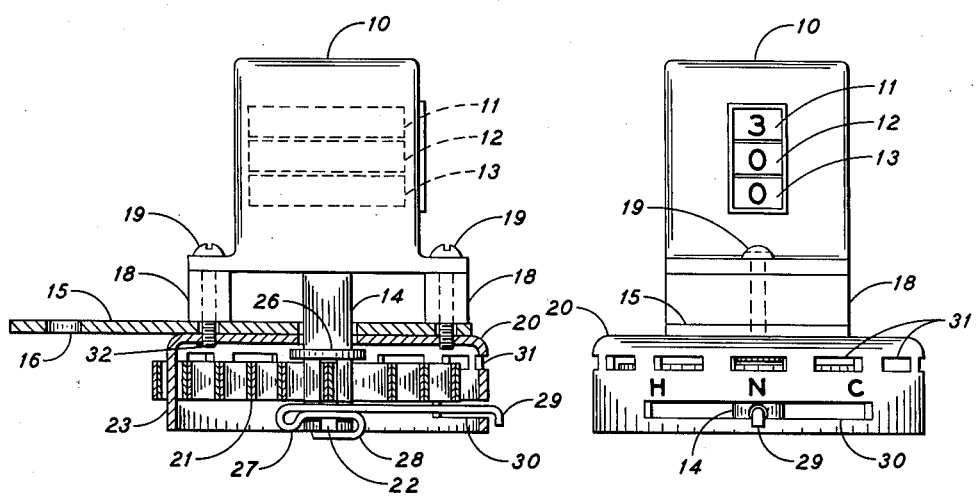
FIGURE 1 is a vertical and part sectional view of a preferred arrangement of a mechanical register and a heat-responsive element for actuating it.
FIGURE 2 is a side elevational view of the arrangement of FIGURE 1.
Figures 3, 4:
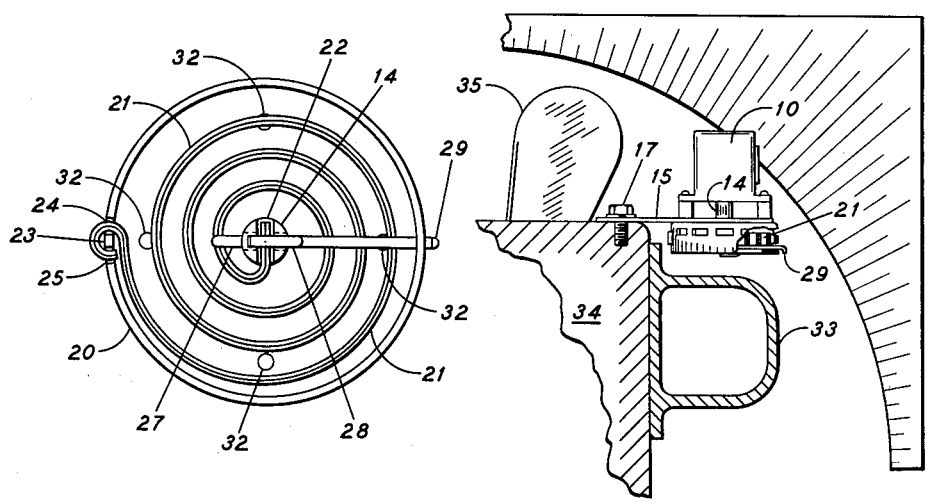
FIGURE 3 is a bottom view of the arrangement of FIGURE 1, illustrating in more detail the heat-responsive means, in this case, a bi-metal spiral.
FIGURE 4 is a diagrammatic vertical and part sectional view of one arrangement for positioning the device adjacent an exposed part of an internal combustion engine that is heated when the engine is operated and is cooled, as by the atmosphere, when the engine is stopped.

Referring to the drawing, and particularly to FIGURES 1 and 3, reference numeral 10 designates a mechanical register having a plurality of visible counting or registering wheels 11, 12, and 13, each carrying numerals or other appropriate indicia, and geared or otherwise connected to a vertical shaft 14. Numerous arrangements of such registers are available, but generally, the type desired for this purpose is one that will advance one of the wheels, e.g., 13, by a single interval or numeral as the shaft 14 is rotated in one direction through a predetermined advance of about 35°. Ratchets and pawls or other means are generally provided within the register so that rotation in the opposite direction will have no effect on the registering wheels. Desirably, all the wheels have on their periphery numerals from 0 to 9, and are connected in decade relation, i.e., wheel 12 advances a single interval after a single complete revolution of wheel 13, and wheel 11 advances a single interval after a single complete revolution of wheel 12.

Register 10 is secured to a suitable mounting bracket 15, which may be a metal strip with an appropriate slot or aperture 16 (FIGURES 1 and 4) for a mounting cap screw or bolt 17. Although a straight section is illustrated, it may take any convenient shape. Desirably, but not necessarily, thermal insulating material spacers or blocks 18 are provided for the register mounting screws 19 to prevent undue transmission of heat to the register mechanism as will be discussed below.

Beneath bracket 5, and secured thereto by register mounting screws 19, is a downwardly facing metal cup 20, which serves a variety of functions. The principal one is that of a guard or protector for a bi-metal spiral 21, which is secured at its inner end to a longitudinal slot 22 in shaft 14 and at its outer end to a metal tang 23 formed by longitudinal slots 24 and 25 at an appropriate location in the side or cylindrical portion of cup 20. Desirably, the outer end of spiral 21 is loosely engaged with tang 23 as shown in FIGURE 3, so as not to interfere with the limited rotation of the spiral 21 and shaft 14 by temperature changes in the spiral.

A convenient arrangement for securing the spiral 21 to shaft 14 is by means of an upper metal clip or washer 26 and a cotter key 27, the latter passing through a transverse hole in shaft 14 below spiral 21, with one leg 28 of key 27 bent backwardly across the end of the shaft and the other end 29 extending transversely across and out of contact with the spiral 21 to project outwardly through a circumferential slot 30 in the cylindrical portion of the cup 20. The outer tip of this longer leg 29 serves conveniently as a means for manually rotating shaft 14 through the limited arc formed by slot 30 (FIGURE 2) to reset counter 10 to any predetermined relationship of wheels 11, 12, and 13. If desired, it may also serve to indicate which is the normal condition of the spiral bi-metal element 21 by appropriate indicia (H—N—C) on the cup adjacent the slot. A circumferential row of vents or slots 31 are formed in the wall of cup 20, as shown, to improve the circulation of hot or cold air around the bi-metal spiral 21. As indicated in FIGURE 3, a plurality of circumferentially spaced tapped holes 32 for register mounting screws 19 may be provided in the closed upper end of cup 20, so that the register face may be selectively positioned with regard to the axis of mounting bracket 15 and the reset member 29 and slot 30.

FIGURE 4 illustrates diagrammatically and partly in section an appropriate location on an internal combustion engine for the assembly just described, so that the heat-responsive bi-metal spiral 21 will be spaced slightly above and exposed to heat from the exhaust manifold 33 of the engine 34 and, hence, will be alternately heated and cooled as the engine is placed in or out of service. Desirably, the assembly is also located where it will be exposed to the blast of air from the cooling system fan 35, so that, after the engine is stopped, the bi-metal spiral 21 will be cooled and restored promptly to its original position during the next operation or start-up of the engine before the exposed part attains its high temperature. Obviously, if a long enough time elapses, the whole engine and assembly will attain the ambient atmospheric temperature.

As stated above, it is desirable, when determining the period between crankcase lubricant drains and replacements, to consider ambient atmospheric temperatures, and particularly those encountered in winter, when the air temperature may range down to 0–30° F. If the bi-metal spiral 21 is properly designed and adjusted, by procedures well known in this art, its cumulative rotational travel will then extend through a greater arc, e.g., 70° or more, than when ambient temperatures are normal, so that each cycle of heating and cooling of the exposed engine part will cause the spiral to advance the counter mechanism by two or even more units. Thus, the more rapid deterioration of the crankcase lubricant under extremely low temperatures of operation will automatically be registered by the added counts that are thereby recorded as just described.

Broadly speaking, the invention comprehends an integrator, such as a mechanical accumulating register, and means responsive to successive temperature change cycles of an internal combustion engine caused by successive starting and stopping thereof, for actuating the integrator, so as to indicate to an observer the optimum periods between crankcase lubricating oil changes.

In conclusion, it will be appreciated that only a single example of a vertically mounted register, and a heat-responsive actuating element therefor, has been illustrated and described. Other arrangements responsive to different parts of the engine and in different aspects, e.g., beside the part instead of above it, could equally well be utilized. Accordingly, all such changes and modifications that come within the scope of the invention, as defined by the appended claims, are intended to be included thereby.

I claim:
1. In combination with a visual registering mechanism having a rotatively advanceable shaft, a bimetal spiral having its inner end secured to said shaft, and positioning means comprising an open cup surrounding the outer periphery of said bimetal spiral, means for securing the outer end of said spiral to said cup, and means for positioning said bimetal spiral in the atmosphere adjacent to a part of an internal combustion engine system that is heated when said engine is in operation, whereby successive heating and cooling cycles of said engine part due to intermittent operation of said engine will rotatively advance said shaft and will be recorded by said registering mechanism.

2. A combination according to claim 1, with the addition of means secured to said shaft and movable with respect to an edge of said cup to advance said shaft and reset said registering mechanism.

3. A combination according to claim 1 adapted to be used in an engine provided with a cooling fan, and wherein the open side of said cup is positioned by said positioning means to place said bimetal spiral in the path of cooling air from said fan.

4. An accumulating register for indicating the number of times an internal combustion engine has been heated and cooled over a predetermined temperature range, comprising in combination a registering mechanism having a rotatively advanceable shaft, an open cup member for supporting said registering mechanism thereon, said cup member having flow passages formed in said cup member remote from the open side thereof, means for mounting said cup member so that its open side is in the air flow path of a part of said engine that is heated during operation and whereby successive heating and cooling cycles of said part due to intermittent operation of said engine will cause air flow between the open side of said cup member and said flow passages, a bimetal spiral positioned in said cup member having its outer end secured to said cup member and its inner end secured to said rotatable shaft, an arm member secured to said rotatable shaft and extending radially outward to the periphery of said cup member, and stop means on said cup member for limiting the radial travel of said arm member to establish the predetermined temperature range for rotation of said shaft.

References Cited in the file of this patent
UNITED STATES PATENTS

| | | |
|---|---|---|
| 293,828 | Weiss | Feb. 19, 1884 |
| 744,407 | Rinsche | Nov. 17, 1903 |
| 1,264,478 | Barstow | Apr. 30, 1918 |
| 1,469,552 | Burdette | Oct. 2, 1923 |
| 1,570,602 | Hobbs | Jan. 19, 1926 |
| 1,626,633 | Sleeper | May 3, 1927 |
| 1,699,104 | Fonseca | Jan. 15, 1929 |
| 1,824,842 | Sleeper | Sept. 29, 1931 |
| 2,320,311 | Myers | May 25, 1943 |
| 2,730,706 | Manke | Jan. 10, 1956 |
| 2,736,499 | Hazen | Feb. 28, 1956 |